United States Patent
Toura (10) Patent No.: US 7,729,016 B2
(45) Date of Patent: Jun. 1, 2010

(54) IMAGE PROCESSING APPARATUS, IMAGE PROCESSING METHOD AND IMAGE PROCESSING PROGRAM FOR USE THEREIN

(75) Inventor: Kosuke Toura, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1189 days.

(21) Appl. No.: 11/322,190

(22) Filed: Dec. 29, 2005

(65) Prior Publication Data
US 2007/0058209 A1 Mar. 15, 2007

(30) Foreign Application Priority Data
Sep. 14, 2005 (JP) ............................. 2005-267218

(51) Int. Cl.
H04N 1/04 (2006.01)
(52) U.S. Cl. ...................... 358/448; 358/443; 358/474; 358/450
(58) Field of Classification Search ................. 358/443, 358/448, 474, 450; 382/274, 254
See application file for complete search history.

(56) References Cited

U.S. PATENT DOCUMENTS

| | | | | |
|---|---|---|---|---|
| 4,958,221 A | * | 9/1990 | Tsuboi et al. | ................ 358/538 |
| 4,979,031 A | * | 12/1990 | Tsuboi et al. | ................ 358/538 |
| 5,124,788 A | * | 6/1992 | Tsuboi et al. | ................ 358/518 |
| 5,495,539 A | | 2/1996 | Sieverding | |
| 6,473,535 B1 | | 10/2002 | Takaoka | |
| 6,701,011 B1 | | 3/2004 | Nakajima | |

2001/0048530 A1 12/2001 Hayashi et al.

FOREIGN PATENT DOCUMENTS

| | | |
|---|---|---|
| JP | 08-202861 A | 8/1996 |
| JP | 8-251393 A | 9/1996 |
| JP | 2638072 B2 | 4/1997 |
| JP | 10-304184 A | 11/1998 |
| JP | 11-150648 A | 6/1999 |
| JP | 2002-209090 A | 7/2002 |
| WO | WO 2005/041093 A1 | 5/2005 |

OTHER PUBLICATIONS

Japanese Office Action dated Dec. 12, 2007 (and English language translation thereof) issued in counterpart Japanese Patent Application No. JP 2005-267218.

* cited by examiner

Primary Examiner—Houshang Safaipour
(74) Attorney, Agent, or Firm—Frishauf, Holtz, Goodman & Chick, P.C.

(57) ABSTRACT

An image processing apparatus includes: a first image processing section to which original image data is inputted; an image storing section connected downstream of the first image processing section; a second image processing section connected downstream of the image storing section; a loop-back path through which image data output from the second image processing section is returned to the first image processing section; an instruction inputting section which inputs an instruction in relation to a processing content; a controller for controlling a flow of image data and contents to be processed in the first and second image processing sections according to the instruction input from the instruction inputting section, wherein a plurality of types of image data different from each other in contents which have been processed, are capable of being generated on the basis of the original image data.

24 Claims, 9 Drawing Sheets

IMAGE PROCESSING APPARATUS, IMAGE PROCESSING METHOD AND IMAGE PROCESSING PROGRAM FOR USE THEREIN

This application is based on Japanese Patent Application No. 2005-267218 filed on Sep. 14, 2005, which is incorporated hereinto by reference.

BACKGROUND OF THE INVENTION

The present invention relates to an image processing apparatus for applying various image processing to image data, an image processing method and an image processing program for use therein, and more particularly, relates to a technology for forming plural types of image data, to which different contents of image processing are applied, from the same image data as an original, and an image processing program for use therein.

Generally an apparatus, such as a digital copier, a scanner or a printer, is designed such that a user can variously set and change the color balance, contrast, sharpness and other attributes of the image to adjust to a desired image quality.

However, a few users can clearly recognize what image quality is achieved only by selecting the setup values. Thus, the user prints and outputs images with various setup values on a trial basis to visually confirm which setup value is required for the desired image quality.

When the above described test printing is individually carried out to different papers every time the setup value is changed, a large amount of paper resource is wastefully consumed, and the comparison itself of the images separately output to many papers requires a lot of time and work. Under these circumstances, there is proposed a sample copy that plural types of images with the setup values changed are output to a single paper all together.

Technologies that realizes the sample copy include a technology for repeatedly reading the same area of a document and changing the setup values of image processing for each reading (see, for example, Patent Document 1), and a technology for setting a plurality of portions within the document and applying different image processing for the individual portions (see, for example, Patent Document 2).

Further, an apparatus is proposed for forming N-types of image data from the same image data, wherein the apparatus is provided with a memory for storing image data obtained by reading the document upstream, a reduction processing section and image processing circuits for carrying out the color adjustment and the like sequentially placed downstream thereof, and a memory further downstream thereof, thereby repeats N-times the operations of applying a reduction processing to the image data read out of the upstream memory, having the image data pass through the image processing circuits, and storing the image data in the downstream memory (see, for example, Patent Document 3). This apparatus is designed to be able to return the image data stored in the downstream memory to the upstream reduction processing section to apply again the image processing to the image data.

[Patent Document 1] Japanese Patent Publication No. 2638072

[Patent Document 2] Japanese Patent Publication Laid-Open No. HEI 11-150648

[Patent Document 3] Japanese Patent Publication Laid-Open No. HEI 8-251393

As disclosed in Patent Document 1, the technology for scanning the document many times requires a long period of time to complete a sample copy due to the longer time of reading. In addition, the hue and tone of the read image data itself may subtly vary in each scan.

As disclosed in Patent Document 2, the technology for applying different image processing to the individual portions set up in the document has a problem that it is difficult to compare the differences in the image processing effects as compared to the case of applying different image processing to the same portion.

As disclosed in Patent Document 3, the apparatus is provided with a memory for storing the image data obtained by reading a document upstream, a reduction processing section and image processing circuits placed downstream of the memory, and a memory for storing the image data having being processed further downstream thereof, in which the memories must be placed upstream and downstream respectively, thereby a lot of memories are required. Particularly, the upstream memory, which stores the image data before being reduced, consumes a large amount of memories. Further, it allows another image processing by returning the image data stored in the downstream memory to the upstream reduction processing section, however, the process contents are only the reduction and color adjustment, providing a few functions realizable, so that the sample copy has not been able to be formed with various items. Further, the image processing is applied to the image data after being reduced, so that the image quality in the sample copy and the image quality in the actual outputting are not precisely identical, and it may also happen that the sample copy does not serve as a test print.

Further, in the conventional technologies, the area of sample copy to be formed was limited to the entire document or a fixed area within the document, and a user could not arbitrarily designate its position and size within the document. Thus, the user could not form a sample copy in an optimum area according to each document, thereby sometimes had difficulty in comparing the differences in the image processing effects, or could not properly understand how the image of the area the user was interested in changed depending on the different setup values, even when forming the sample copy.

SUMMARY OF THE INVENTION

The present invention is to solve the above problems, and has an object to provide an image forming apparatus capable of forming plural types of image data to which different image processing contents are applied, from the same image data as an original with a small memory, and that allow various and precise image comparisons relative to a desired area, an image forming method and an image processing program for use therein.

An image processing apparatus comprising:

(a) a first image processing section to which original image data is inputted;

(b) an image storing section connected downstream of the first image processing section;

(c) a second image processing section connected downstream of the image storing section;

(d) a loop-back path through which image data output from the second image processing section is returned to the first image processing section;

(e) an instruction inputting section which inputs an instruction in relation to a processing content;

(f) a controller which controls a flow of image data and contents to be processed in the first and second image processing sections according to the instruction input from the instruction inputting section, wherein a plurality of types of image data different from each other in contents which have been processed, are capable of being generated on the basis of the original image data.

An image processing apparatus comprising:

(a) a first image processing section to which original image data is inputted;

(b) an image storing section connected downstream of the first image processing section;

(c) a second image processing section connected downstream of the image storing section;

(d) a loop-back path through which image data output from the second image processing section is returned to the image storing section;

(e) an instruction inputting section which inputs an instruction in relation to a processing content;

(f) a controller for controlling a flow of image data and contents to be processed in the first and second image processing sections according to the instruction input from the instruction inputting section, wherein a plurality of types of image data different from each other in contents which have been processed, are capable of being generated on the basis of the original image data.

An image processing apparatus comprising:

(a) a first image processing section to which original image data is inputted;

(b) an image storing section connected downstream of the first image processing section;

(c) a second image processing section connected downstream of the image storing section;

(d) a loop-back path through which image data read out from the image storing section is returned to the first image processing section;

(e) an instruction inputting section which inputs an instruction in relation to a processing content;

(f) a controller for controlling a flow of image data and contents to be processed in the first and second image processing sections according to the instruction input from the instruction inputting section, wherein a plurality of types of image data different from each other in contents which have been processed, are capable of being generated on the basis of the original image data.

An image processing method comprising:

(a) a first step of inputting original image data and processing in a first image processing section;

(b) a second step of storing the image data output from the first image processing section into an image storing section;

(c) a third step of reading out the image data stored in the image storing section and processing in the second image processing section;

(d) a fourth step of returning the image data output from the second image processing section to the first image processing section and reprocessing;

(e) a fifth step of storing the reprocessed image data into the image storing step; and (f) repeating the third step through the fifth step while changing a content to be processed in the first and second image processing sections, thereby generating a plurality of types of image data different from each other in contents which have been processed.

DETAILED DESCRIPTION OF THE PREFERRED EMBODIMENT

Hereinafter, the embodiment of the present invention will be described with reference to the drawings.

Figure 1:
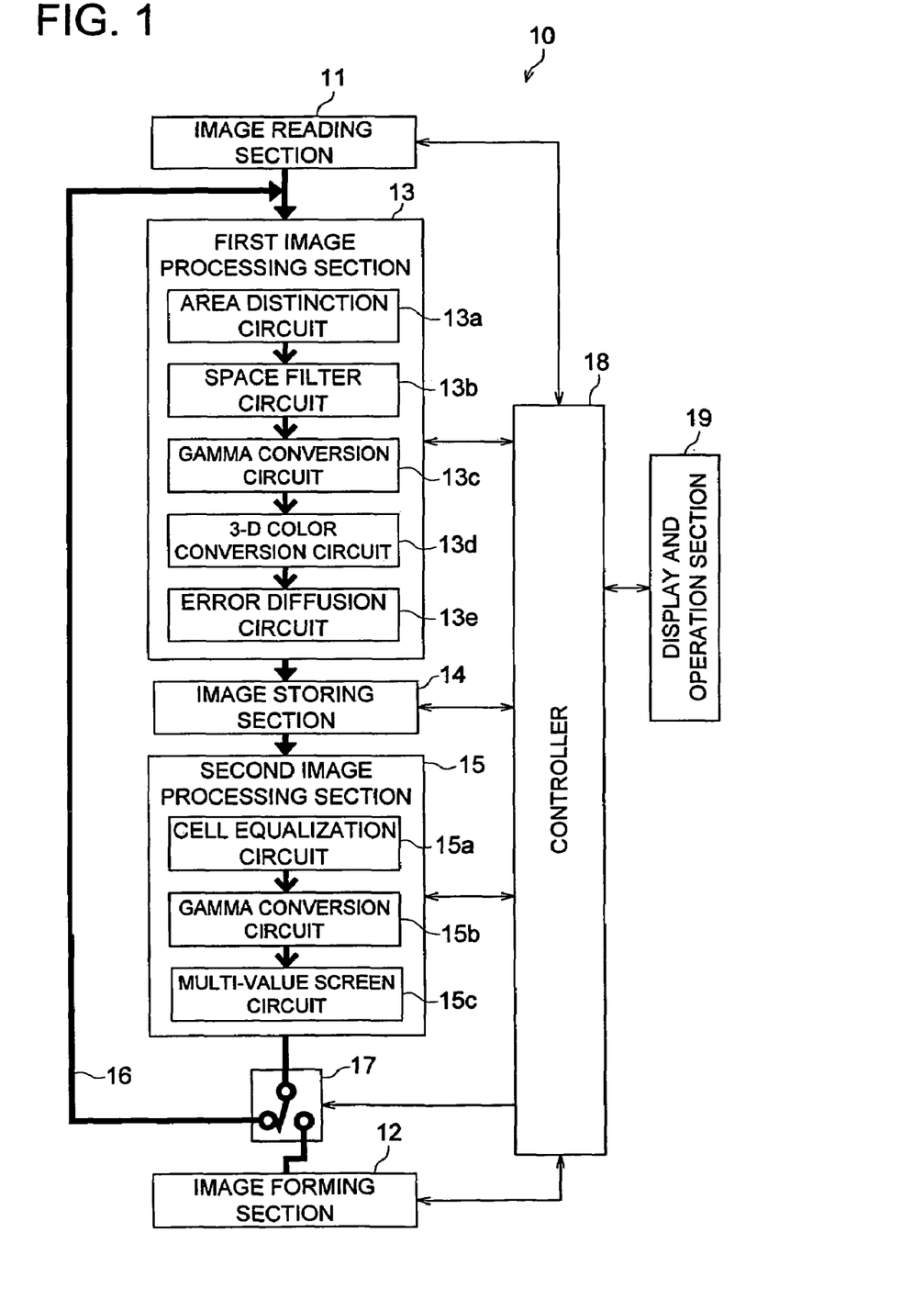
FIG. 1 is a block diagram showing the electrical structure of an image processing apparatus according to an embodiment of the invention.

FIG. 1 shows the electrical structure of an image processing apparatus 10 according to the embodiment of the invention. Herein, the image processing apparatus 10 is configured as a color digital multifunctional machine, including: a copy function for reading a document image to form a duplicated image thereof on a paper; a printer function for printing based on the print data received from an external terminal; and a scanner function for outputting the image data obtained by reading the document to the external terminal and the like.

The image processing apparatus 10 has an image reading section 11 for reading a document image to obtain color image data and an image forming section 12 for forming an image on a paper based on the image data. Between these sections, the image processing apparatus 10 includes: a first image processing section 13 to which image data the image reading section 11 outputs is input; an image storing section 14 connected downstream of the first image processing section 13; a second image processing section 15 connected downstream of the image storing section 14; a loop-back path 16 for returning the image data, the second image processing section 15 outputs, to the first image processing section 13; a path switch 17 for switching so that the image data, the second image processing section 15' outputs, is output either to a loop-back path 16 or to the image forming section 12; a controller 18 for integrally controlling the operations of the image processing apparatus 10; and a display and operation section (also referred to as an instruction inputting section) 19.

The image reading section 11 is provided with a light source for irradiating the document; a color line image sensor for reading the document for one line in its wide direction; a moving section for moving the reading position per line in the direction of the document length; and an optical path composed of a lens and mirror for guiding a reflection light from the document to the line image sensor to be imaged. The line image sensor is composed of a CCD (Charge Coupled Device), and outputs analog image signals for individual colors of red (R), green (G), blue (B); The image reading section 11 analog/digital converts the analog image signals to output the digital image data of individual colors R, G, B. Incidentally, the notation of the colors is omitted in the description and the figures below.

The image processing section 13 of FIG. 1 is composed of a plurality of circuit groups for applying the image processing to the image data input from the image reading section 11. Specifically, included are such as: an area distinction circuit 13a for carrying out the distinction between the character area and the picture area within the image; a space filter circuit 13b for filtering out the noise and adjusting the degree of sharpness; a gamma conversion circuit 13c; a 3-D color conversion circuit 13d for adjusting the hue, saturation, lightness and other image attributes; and an error diffusion circuit 13e for converting into image data in which the halftone can be virtually represented while lowering the number of density levels per pixel. The error diffusion circuit 13e converts, for example, the gray scale image data represented by 4 bits per pixel into the image data represented by 1 bit per pixel, thereby it functions as a circuit for reducing the data amount of the image data.

The processing circuits are serially connected within the first image processing section 13, and the processing circuits 13a to 13d, in which the reduction in the number of density levels per pixel (data amount reduction) by the error diffusion processing influences the processing results, are placed upstream of the error diffusion circuit 13e. For example, the gamma conversion circuit 13c, which is a circuit for converting the gradation characteristics of the grayscale image data according to the gamma curve, is used for the density adjustment. Thus, the gamma conversion circuit 13c needs to be input with the image data in which each pixel is represented as grayscale, so that it is placed upstream of the error diffusion circuit 13e that reduces the number of density levels.

The image storing section 14 is composed of a memory not shown for storing the image data output from the first image processing section 13, and a memory control section not shown for providing controls, such as operation control of data reading and writing to the memory and address control. Incidentally, it may be configured such that the image data can be saved and stored from the memory by connecting a hard disc device to the image storing section 14 via a compression and expansion section.

The second image processing section 15 is composed of circuit groups for applying image processing to the image data read out of the image storing section 14. Specifically, included are, such as, a cell equalization circuit 15a, a gamma conversion circuit 15b, and a multi-value screen circuit 15c. The cell equalization circuit 15a is a processing circuit for increasing the number of density levels in exchange of the resolution, by making the image data with the small number of density levels per pixel the "cell" size of 2×2 pixels or 3×3 pixels, and deeming it as one pixel. The gamma conversion circuit 15b is a processing circuit for applying the gamma conversion to the image data with the number of density levels increased in the cell equalization circuit 15a, and the multi-value screen circuit 15c is a processing circuit for making the image data with characters and pictures mixed therein clear. The second image processing section 15 is a circuit in which the reduction in the number of density levels (data amount reduction) by the error diffusion processing in the first image processing section 13 is unlikely to influence the processing results. Incidentally, when the image data is passed through the second image processing section 15, the number of density levels increases, and the data amount of the image data may sometimes increase.

The first and second image processing sections 13, 15 are configured such that one or more image processing among plural types of image processing respectively executable are selectively controlled by the controller 18 in an executable manner. In other words, the controller 18 can selectively cause only one or more circuits among the circuits 13a to 13e, 15a to 15c to operate to apply the image processing. Herein, the circuits not applying the image processing have the image data pass through without processing. For example, in the space filter circuit 13b, the controller 18 causes the circuit to operate by setting the contents of the space filter to all "1", the input image data is output as it is without being processed. By causing the entire built-in circuits to operate so as to apply no processing as described above, the first and second image processing sections 13, 15 can have the image data pass through practically without processing. Incidentally, it may be configured such that the controller 18 controls the image data to practically bypass the data path to pass through the unnecessary processing circuits.

The circuits 13a to 13e and 15a to 15c of the first and second image processing sections 13, 15 are configured such that the image processing contents are changeable by the setup parameter values. For example, it is possible to change, by the parameters (setup values), the area distinction standard for the area distinction circuit 13a, the space filter type for the space filter circuit 13b, the gamma curves for the gamma conversion circuits 13c and 15b, the conversion characteristics for the 3-D color conversion circuit 13d, the number of bits per pixel after the error diffusion processing for the error diffusion circuit 13e, the cell size for the cell equalization circuit 15a, and the screen type for the multi-value screen circuit 15c and the like.

The path switch 17 is composed of a gate circuit. When the path switch is placed in the loop-back path 16 side, the image data output from the second image processing section 15 is input to the upstream first image processing section 13 via the loop-back path 16. When the path switch 17 is placed in the image forming section 12 side, the image data output from the second image processing section 15 is input to the image forming section 12.

The image forming section 12 for forming and outputting an image corresponding to the input image data through the photography process on a paper, is configured as a color print engine having a paper conveyance device, a photoconductor drum, a charger, a laser unit, a development device, a transfer-separation unit, a cleaning device, a fixing device and the like.

The display and operation section 19 for fulfilling the function of displaying the guidance and states involving the various processing to a user and receiving the various operations from the user, is composed of a liquid crystal display equipped with a touch panel on the surface thereof and various operation switches.

The controller 18 is composed of a CPU, a flash memory, a RAM and other related components as the main sections. The controller 18 integrally controls the operations of the image processing apparatus 10, and fulfils the functions of controlling the flow of image data and the image processing contents, by setting the parameters for the first image processing section 13, the image storing section 14 and the second image processing section 15, issuing the commands, receiving the processing completion response, and outputting a control signal for switching to the path switch 17.

The image processing apparatus 10 is equipped with a forming function of a sample copy provided by printing together the plural types of sample images relative to the image as an original input from the image reading section 11 and the like, with the setup values changed, such as, for density, color balance, contrast and sharpness. The display and operation section 19 functions as an instruction inputting section for receiving an instruction about which setup value is selected and how it is changed to form a sample copy, wherein the controller 18, according to the instruction received in the display and operation section 19, controls the first and second image processing sections 13, 15 and the like to execute the forming operation of the sample copy.

Incidentally, the image data as an original when forming the sample copy may be input by the image reading section 11 or through a printer I/F not shown, to the first image processing section 13. The formed image data in the image storing section 14 can be output to the external device through a scanner I/F not shown.

Figure 2:
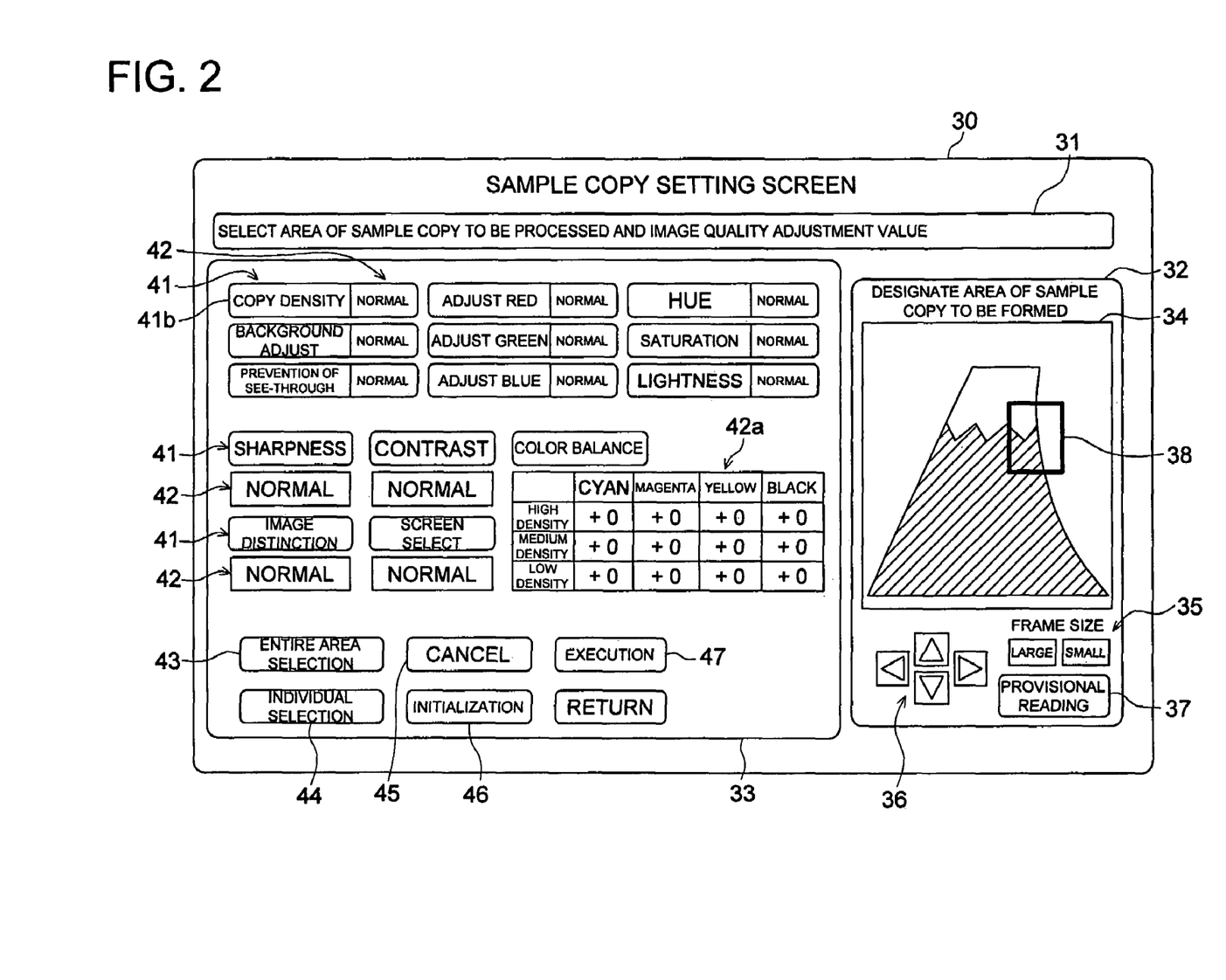
FIG. 2 is an illustrative view showing an example of a sample copy setting screen displayed in a display and operation section of the image processing apparatus according to the embodiment of the invention.

FIG. 2 shows an example of the sample copy setting screen 30 displayed in the display and operation section 19. The sample copy setting screen 30 fulfills the functions of selecting the types of image processing to be applied in the sample copy formation, designating the setup values, designating the area of sample copy to be formed within the document, and receiving the operations. The sample copy setting screen 30 is provided with a message field 31 for displaying the operation guidance, an area designation section 32 for designating the area of sample copy to be formed, and a processing designation section 33 for selecting the types and contents of the image processing to be applied.

The area designation section 32 is provided with a display area 34, a frame size selection button 35, a frame move button 36 and a "provisional reading" button 37. When the "provisional reading" button is pushed down, the image reading section 11 reads the document at low resolution with high speed, and its thumbnail image (reduced image) is displayed in the display area 34. Displayed in the display area 34 is a rectangle area designation frame 38 for identifying the area of sample copy to be formed. The size of the area designation frame 38 can be selected to several levels by the frame size selection button 35, and the area designation frame 38 can be moved freely in the vertical and horizontal directions by operating the frame move button 36.

The processing designation section 33 has, for the individual image adjustment items, item selection buttons 41 for selecting the items, and setup value fields 42 for displaying the current setup values for the individual items the item selection buttons 41 indicate, wherein the corresponding item selection buttons 41 and setup value fields 42 are placed in pairs respectively. As for the color balance, the setup values involving the combinations of the densities (high, medium, low) and the color types (C, M, Y, K) are displayed in a table form, in which the vertical axis is for the densities and the horizontal axis is for the color types. Every time the corresponding part in this table 42a is pushed down, the setup value of the part is changed. As for the items other than the color balance, every time each of the item selection buttons 41 is pushed down, the setup value displayed in the corresponding setup value field 42 is sequentially changed.

Of the items selectable in the sample copy setting screen 30, the image processing corresponding to the copy density, background adjustment, prevention of see-through, contrast, adjust read, adjust green, and adjust blue are carried out in the gamma conversion circuit 13c of the first image processing section 13. The adjustment of the hue, saturation, and lightness are carried out in the 3-D color conversion circuit 13d of the first image processing section 13, the sharpness adjustment is carried out in the space filter circuit 13b of the first image processing section 13, and the image distinction is carried out in the area distinction circuit 13a of the first image processing section 13 respectively. The color balance adjustment is carried out in the gamma conversion circuit 15b of the second image processing section 15, and the processing corresponding to the screen selection is carried out in the multi-value screen circuit 15c of the second image processing section 15.

The "entire area selection" button 43 at the bottom of the processing designation section 33 is an operation button for designating to form a sample copy relative to a specific item, with all setup values that the item can take. For example, when the "entire area selection" button 43 is operated and then a "copy density" button 41b is operated, the current setup values are commonly employed for the items other than the copy density, and the color density values of "−2", "−1", "normal", "+1", "+2" are set to form five types of sample images.

An "individual selection" button 44 is for the additional setting of forming one sheet of sample image with the setup values currently displayed. By repeating the change of the setup values and the pushing down of the "individual setting" button 44, the instruction of forming plural types of sample images with different setup values is established.

When a "cancel" button 45 is operated, the setting already done is canceled, and when an "initialization" button 46 is operated, the individual setup values displayed in the processing designation section 33 are retuned to the initial values. When an "execution" button 47 is operated, the sample copy formation is executed with the contents having been established.

Figure 3:
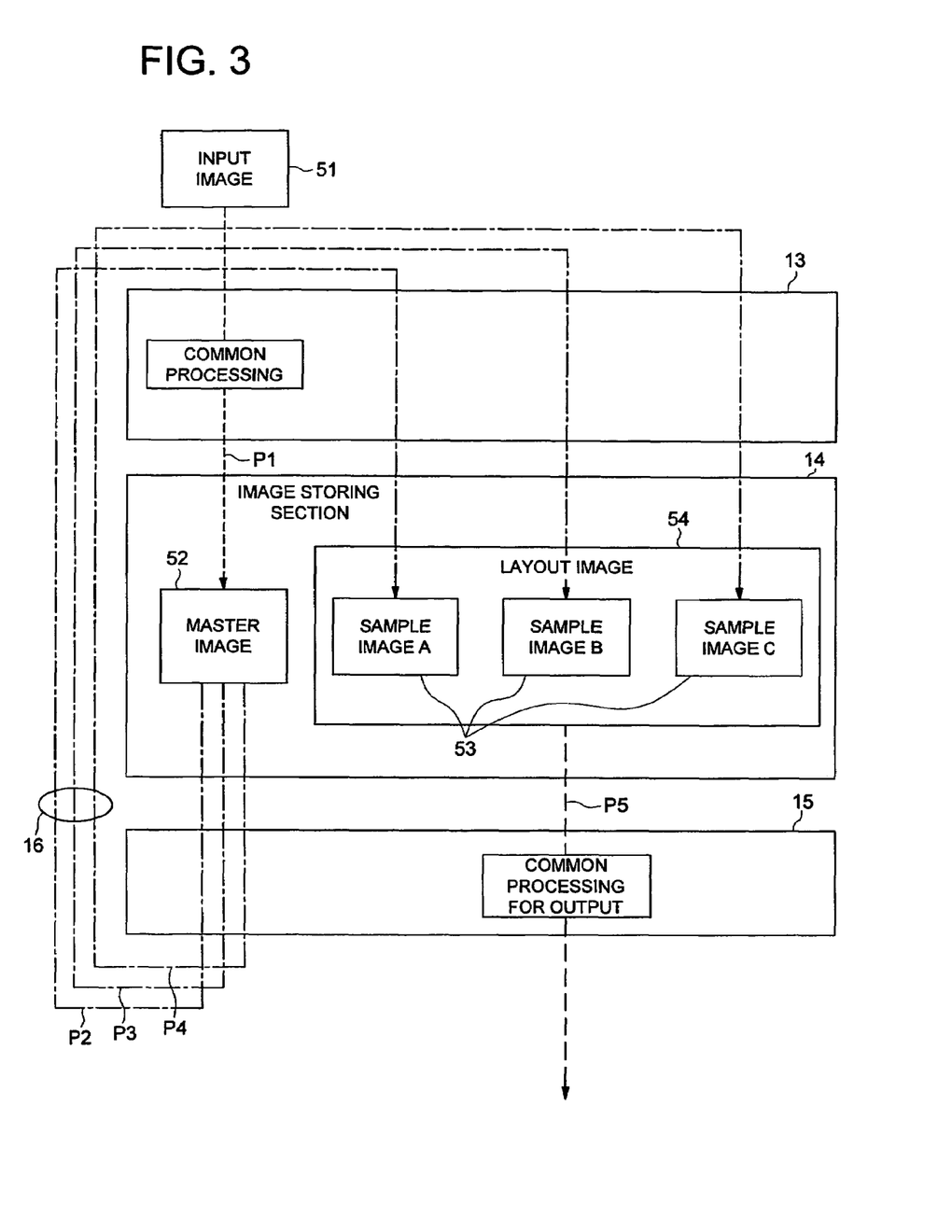
FIG. 3 is an illustrative view showing the general flow of image data when the image processing apparatus forms a sample copy.

FIG. 3 shows the general flow of image data when the image processing apparatus 10 forms a sample copy. An input image 51 having been input through the image reading section 11 or the printer I/F is subjected to the image processing (common processing) in the first image processing section 13, or passed through the first image processing section 13 without being processed, and is stored as a master image 52 in the image storing section 14 (P1). This master image 52 is read out of the image storing section 14, subjected to the various image processing during through the path from the second image processing section 15 to the loop-back path 16 and to the first image processing section 13, and then is stored as a sample image 53 in the image storing section 14. Such operations are executed multiple times with changing the image processing contents to be applied (P2, P3, P4), and thereby the plural types of sample images 53 are formed in the image storing section 14.

The sample images 53, when stored in the image storing 14, are laid out and stored in the image area corresponding to the output paper. In the example of FIG. 3, the sample images 53 of three types A, B, C formed from the same master image, are laid out in the image area corresponding to one sheet of output paper to provide a layout image 54 for one sheet of paper. The finished layout image 54 is read out of the image storing section 14, subjected to the image processing for output (common processing for output) in the second image processing section 15, and is output to the image forming section 12 to print a sample copy (P5).

How the sample images 53 are laid out may be determined by the controller 18 automatically depending on the size of each sample image 53 and the designated number, or by receiving the instruction from the user.

Figure 4:
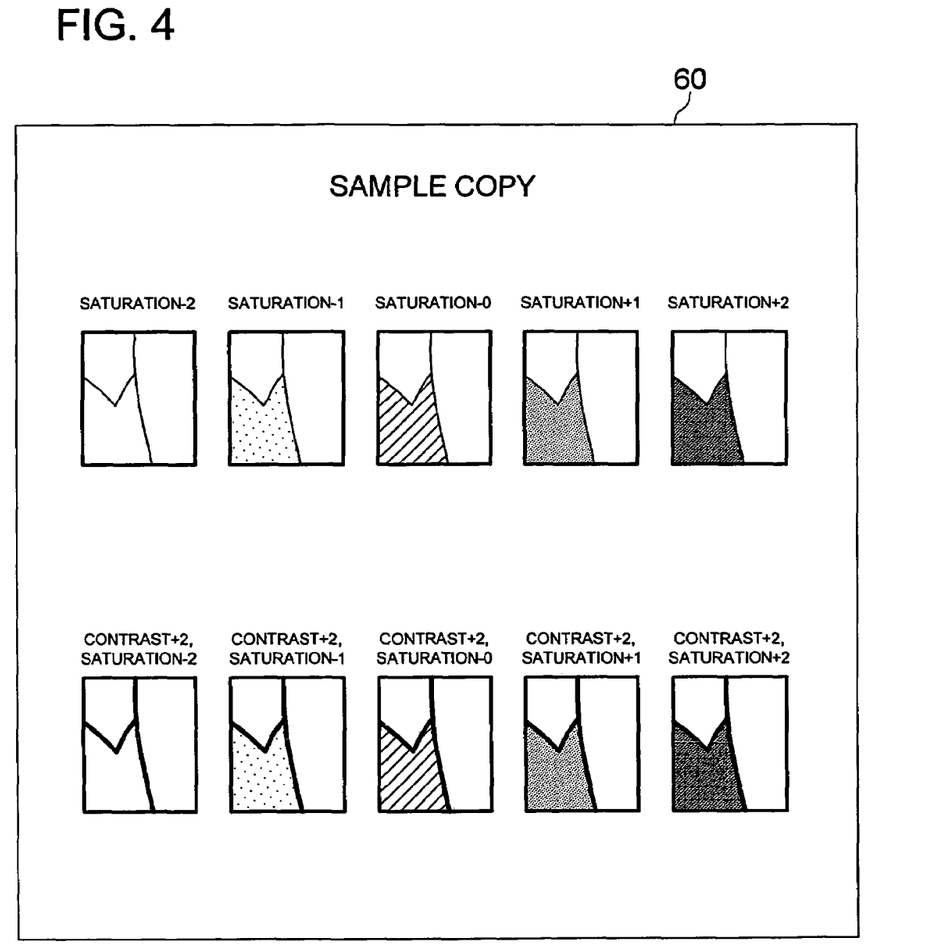
FIG. 4 is an illustrative view showing an output example of the sample copy.

FIG. 4 shows an output example of a sample copy 60. Formed in the upper part of the sample copy 60 shown in FIG. 4 are the sample images with the saturation changed one by one from "−2" to "+2" relative to the target area designated in the area designation frame 38 of FIG. 2. Formed in the lower part thereof are the sample images with the contract set to "+2" and the saturation changed one by one from "−2" to "+2".

Figure 5:
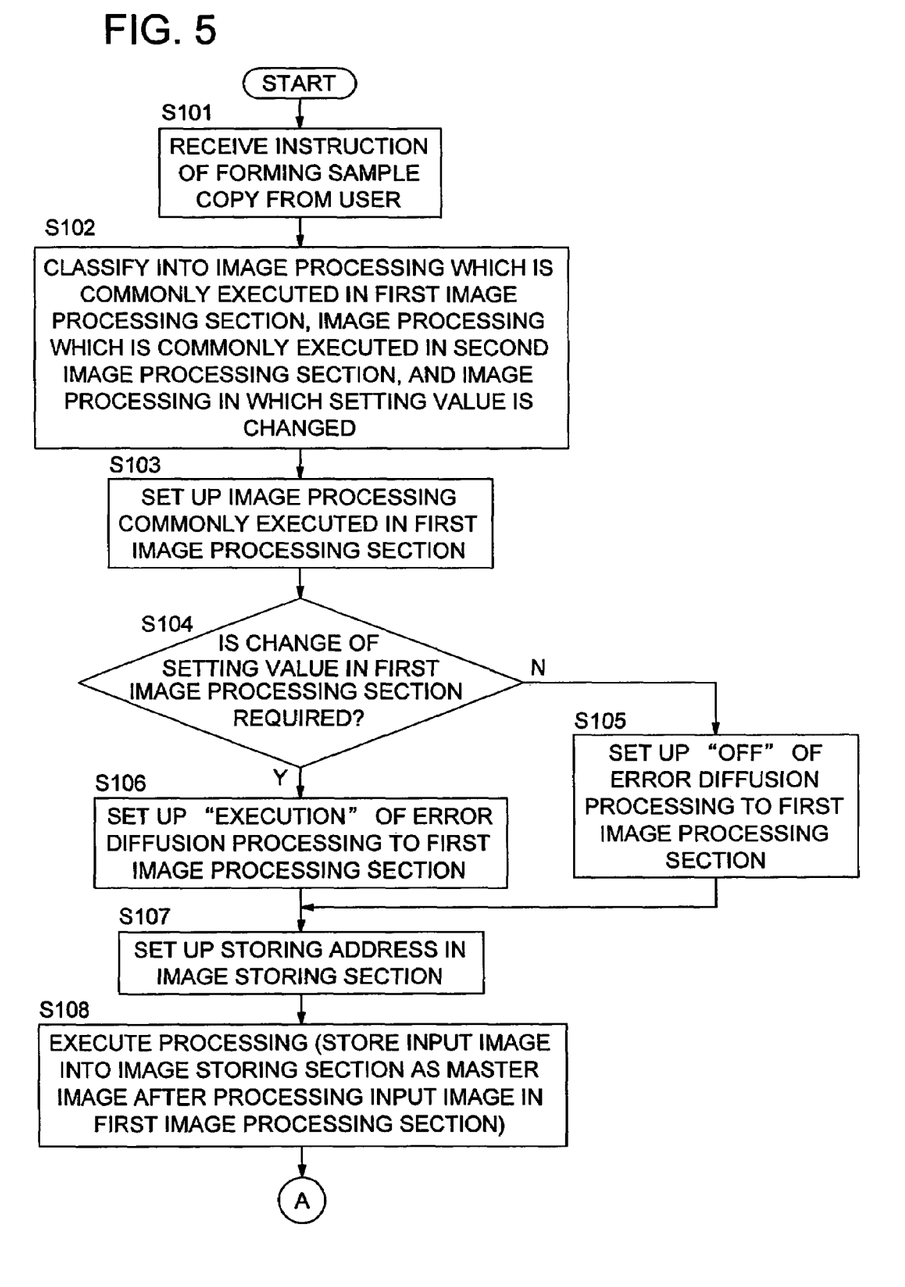
FIG. 5 is a flowchart showing the processing by which the image processing apparatus forms the sample copy.
Figure 6:
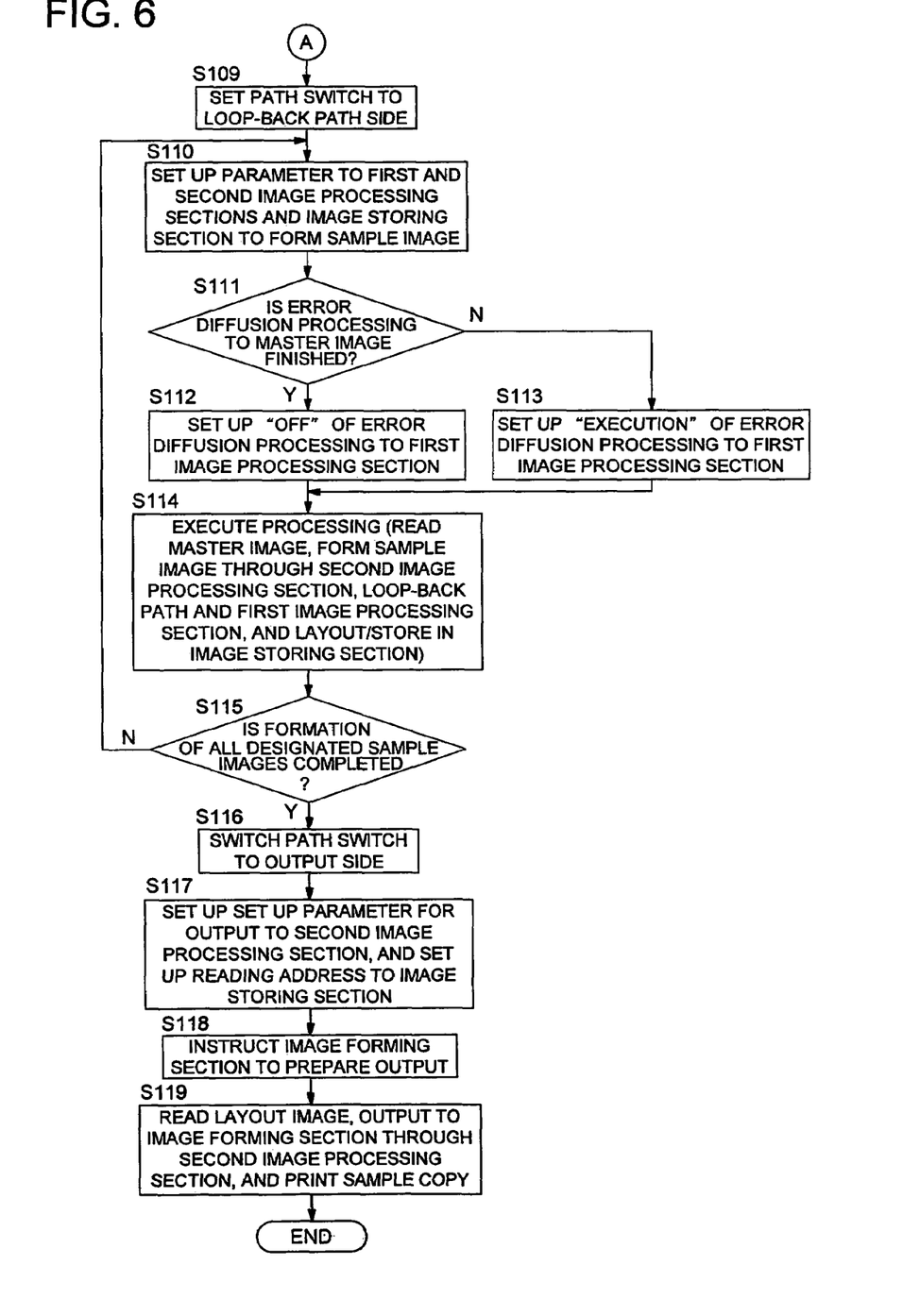
FIG. 6 is a continued flowchart of FIG. 5.

FIGS. 5 and 6 show the flow of the processing by the controller 18 when the image processing apparatus 10 forms a sample copy. When the user carries out a predetermined operation from a standby screen and the like, the sample copy setting screen 30 of FIG. 2 is displayed, in which various instructions involving the sample copy formation are received (Step S101). Specifically, the user sets a document from which the user wants to form a sample copy in the image reading section 11, operates the "provisional reading" button 37 of the sample copy setting screen 30 to cause a thumbnail image to be displayed in the display area 34, and moves the area designation frame 38 to set a desired area of sample copy to be formed. The user also operates the buttons of the processing designation section 33 to designate the types and contents of the image processing.

When the "execution" button 47 of the sample copy setting screen 30 is operated, the controller 18 analyzes the designated processing contents, and sorts into the image processing commonly executed in the first image processing section 13, the image processing commonly executed in the second image processing section 15, and the image processing in which the setup values are changed for each sample image, in the sample image formation (Step S102). Incidentally, of the processing to be executed in the first and second image processing sections, the processing to be commonly executed are the processing without being designated in the processing designation section 33 by the user, in other words, the processing in which the setup values are not changed for each sample image.

Then, the parameters relating to the image processing to be commonly executed in the first image processing section 13 are set in the first image processing section 13 (Step S103). Further, the user checks, of the image processing to be executed in the first image processing section 13, whether or not the image processing in which the setup value is changed for each sample image exists (Step S104), and when the processing in which the setup value is changed for each sample image does not exist (Step S104; N), the user sets "off" of the error diffusion processing to the error diffusion circuit 13e of the first image processing section 13 (Step S105). On the other hand, when the image processing in which the setup value is changed for each sample image exists in the first image processing section 13, namely, in the case of only the common processing (Step S104; Y), the user sets "execution" of the error diffusion processing to the error diffusion circuit 13e of the first image processing section 13 (Step S106).

After completing the above settings, the user sets a storage address of the master image 52 to the image storing section 14 (Step S107), and further designates "execution" of the processing to all of the circuits 13, 14, and 15 (Step S108). Thereby, the master image 52 is formed from the input image 51 and stored in the image storing section 14.

Next, the user sets the path switch 17 to the loop-back path 16 side (Step S109), and sets the parameters for forming the sample images 53 from the master image 52 to the first image processing section 13, the image storing section 14, and the second image processing section 15 respectively (Step S110). Specifically, the user sets a reading address of the master image 52 to the image storing section 14. Herein, the user sets the address region corresponding to the target area designated in the area designation frame 38. The user also sets the address of an area for storing the formed sample image 53. This address is set according to the layout on the paper for output. Further, the user sets the parameters to the second and first image processing sections 15, 13, involving the image processing to be executed by these processing sections. In other words, the settings for the unprocessed image processing are made, and not for the image processing already processed. Particularly, the settings relating to the image processing in which the setup values are changed for each sample image are made.

Herein, when the master image 52 is the image data to which the error diffusion processing has been applied (Step S111; Y), the user sets "off" of the error diffusion processing to the error diffusion circuit 13e of the first image processing section 13 (Step S112), and when the error diffusion processing is not done (Step S111; N), the user sets "execution" of the error diffusion processing to the error diffusion circuit 13e of the first image processing section 13 (Step S113).

After completing the above settings, the user designates "execution" of the processing for all of the circuits 13, 14, 15 (Step S114). Thereby, the sample images 53 are formed from the master image 52, and laid out and stored in a predetermined area of the image storing section 14.

When the formation of the whole sample images designated by the sample copy designation received from the user is not completed (Step S115; N), the next sample image is forms (Steps S110 to S114). When the formation of the whole sample images is completed (Step S115; Y), the user switches the path switch 17 to the output side (Step S116), sets the parameters of the common processing for output to the second image processing section 15, and sets the reading address of the layout image 54 to the image storing section 14 (Step S117). Then, the user instructs the output preparation to the image forming section 12, and when the preparation is completed (Step S118), the user instructs "execution" of the processing to all of the circuits 13, 14, 15 (Step S119). Thereby, the layout image 54 is read out of the image storing section 14, and subjected to the processing for output (common processing for output) in the second image processing section 15 to output the image data of the layout image to the image forming section 12, and then the sample copy is printed.

Figure 7:
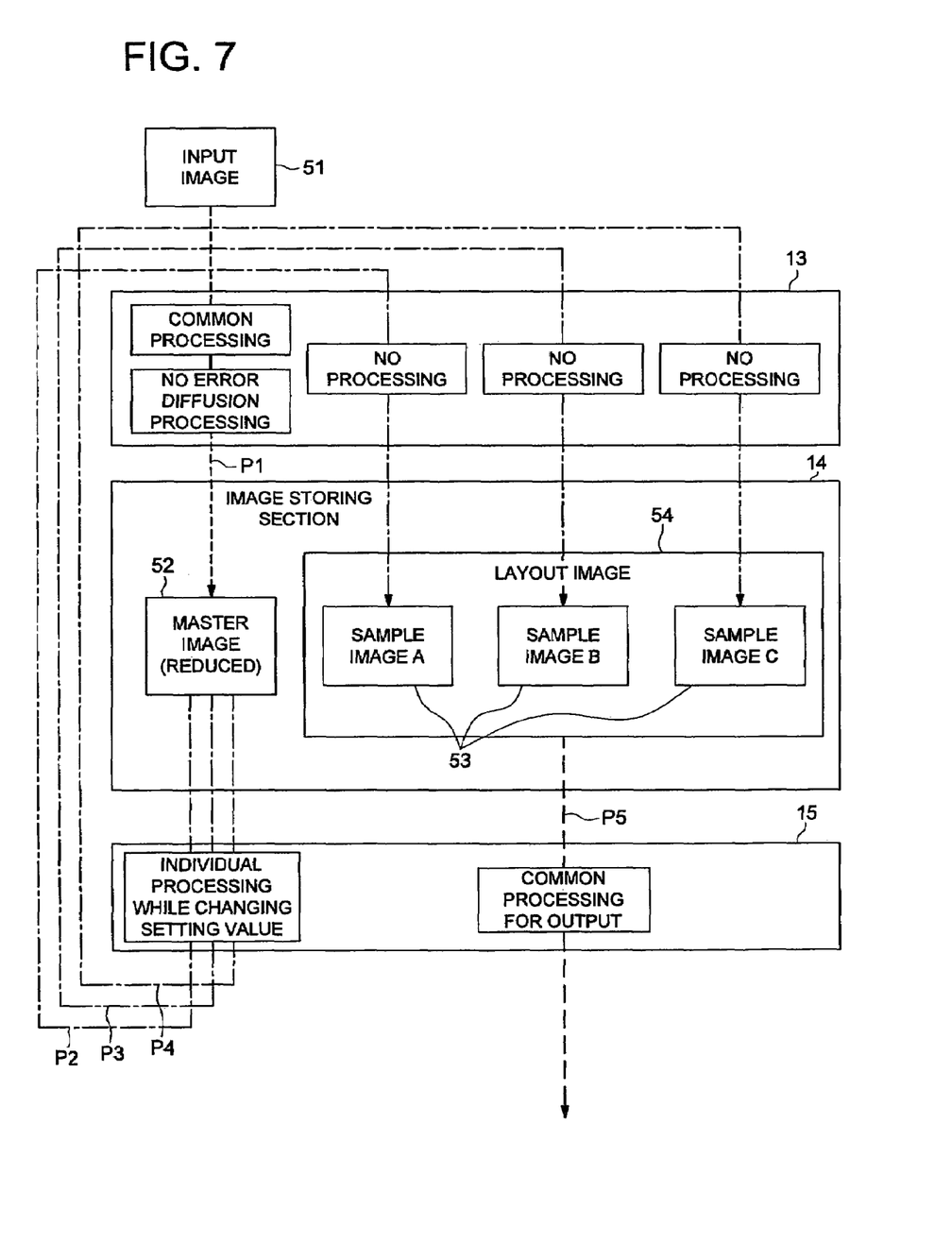
FIG. 7 is an illustrative view showing the flow of image data in the case of applying an error diffusion processing when forming a master image.

FIG. 7 shows the flow of image data in the case of applying the error diffusion processing when forming the master image 52. The error diffusion processing is applied in the forming process P1 of the master image 52, so that the data amount of the master image 52 is reduced as compared to that of the input image 51, allowing to lower the required storing capacity of the image storing section 14. Particularly, the master image 52 is corresponding to the entire document image and not to the target area designated in the area designation frame 38, so that the data amount reduction by the error diffusion processing is substantially effective.

In the processes P2 to P4 of forming the sample image 53 from the master image 52, the image data is subjected to the image processing in which the setup values are changed for each sample image in the second image processing section 15, while passing through the first image processing section 13 without being processed. The second image processing section 15 executes the image processing that are not or unlikely to be influenced by the error diffusion processing, thereby can appropriately apply the image processing to the master image 52 even when subjected to the error diffusion processing. On the other hand, the first image processing 13 includes the image processing in which the data amount reduced by the error diffusion processing influences the processing results. However, all of the image processing to be executed in the first image processing section 13 have been completed in the forming process P1 of the master image 52 before the error diffusion processing that the first image processing section 13 applies no processing in the processes P2 to P4 of forming the sample images 53 from the master image 52, thereby the sample images 53 are not influenced by the fact that the master image 52 is subjected to the error diffusion processing.

Incidentally, the processing commonly executed in the second image processing section 15 to the sample images may be executed in the processes P2 to P4 of forming the sample images 53 from the master image 52, or executed in the output process P5 of the layout image 54.

Figure 8:
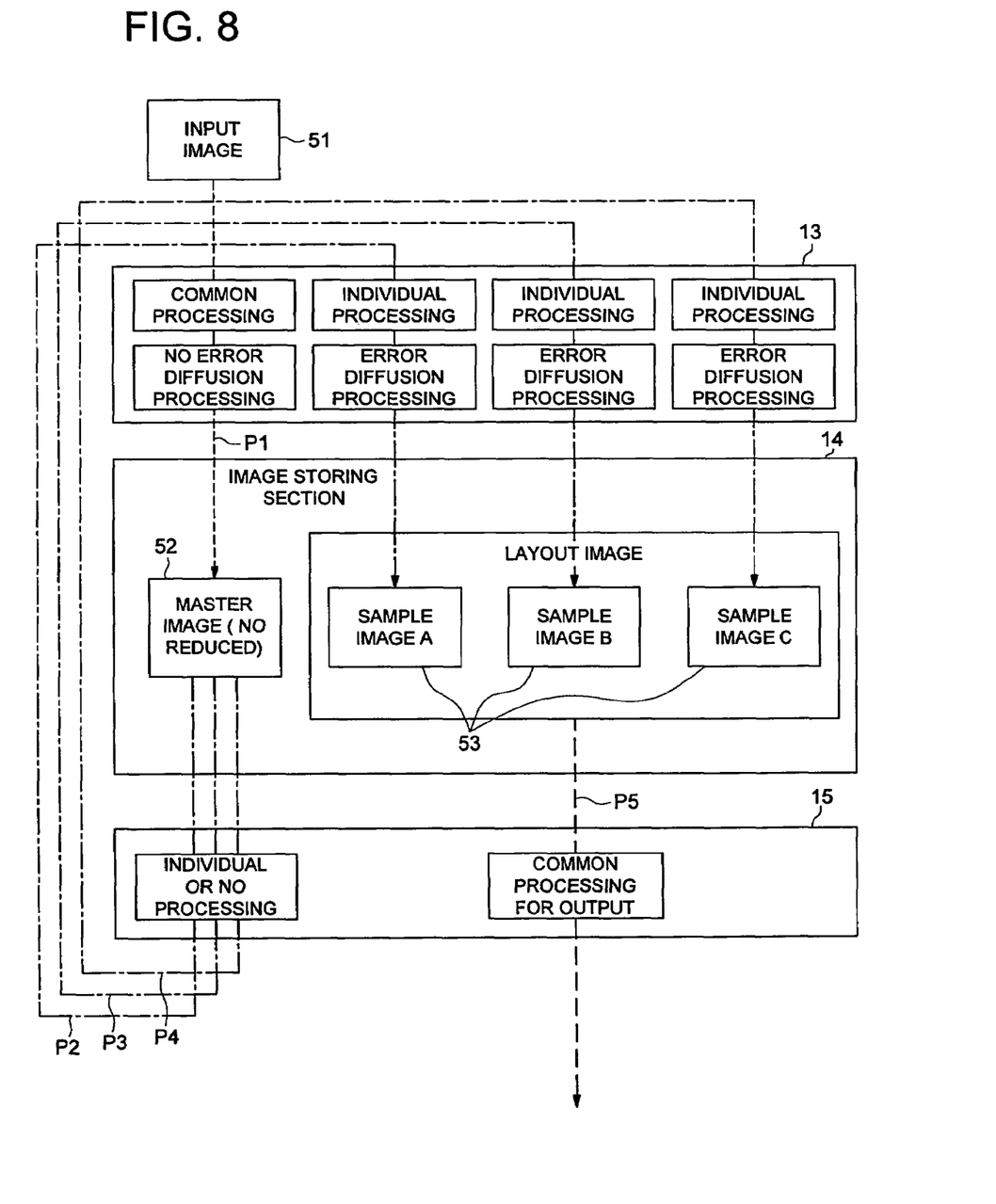
FIG. 8 is an illustrative view showing the flow of image data in the case of not applying the error diffusion processing when forming the master image.

FIG. 8 shows the flow of image data when the error diffusion processing is not applied when forming the master image 52. In the process P1 of forming the master image 52, the master image 52 to which the image processing common to the sample images is applied while the error diffusion processing is not applied in the first image processing section 13 is formed. Thereby, the data amount reduction effect cannot be obtained for the master image 52.

In the processes P2 to P4 of forming the sample image 53 from the master image 52, the image data is subjected to the image processing in which the setup values are changed for each sample image in the second image processing section 15, or the image data passes through the second image processing section 15 without being processed. The image data is further subjected to the image processing in which the setup values are changed for each sample image in the first image processing section 13, and finally subjected to the error diffusion processing in the error diffusion circuit 13e of the first image processing section 13, thereby the sample images 53 with the data amount reduced are formed, laid out and stored in the image storing section 14.

As the master image 52 is not subjected to the error diffusion processing, even when the image processing are applied in the first image processing section 13 through the processes P2 to P4 of forming the sample images 53 from the master image 52, the appropriate processing results can be obtained. Further, there is no more processing to be applied to the sample images for which all of the image processing to be executed in the first image processing section 13 are completed, so that the sample images are finally subjected to the error diffusion processing in the error diffusion circuit 13e and stored in the image storing section 14. Thereby, the data amount of the sample images 53 is reduced, which contributes to reducing the storing capacity in the image storing section 14.

As described above, it allows to selectively execute the image processing, pass through without processing, and individually change the parameters, providing less restrictions on executable functions, thereby the sample copy can be formed with various items.

Further, the sample images are formed exclusively to the target area, which allows to fit a plurality of sample images to one sheet of paper without applying the reduction processing to the images, showing no image quality degradation and tint change compared to the case of applying the reduction processing to the images, enabling the precise comparison in the magnification of the practical printing.

Further, the user can arbitrarily change the position and size of the target area, thereby can form the sample copy to the area in which the differences in the image processing effects are easily compared or in which the user is interested, according to the document. The sample images are formed exclusively to the target area, allowing to reduce the storing capacity required for storing the processing results.

Having described preferred embodiment of the invention with reference to the accompanying drawings, it is to be understood that the specific configuration is not limited to those described in the embodiment and that modifications and additions could be included in the invention without departing from the spirit or scope of the invention.

In the embodiment, the image of the entire document is stored as the master image 52, but it may be configured such that only a portion corresponding to that designated in the area designation frame 38 is stored as the master image 52.

Further, the embodiment is designed, when the image processing in which the setup values are changed for each sample image in the image processing to be executed in the first image processing section 13 exists, not to apply the error diffusion processing in the forming process of the master image 52, but the error diffusion processing may be applied with lowering the number of density levels within the acceptable range of the influence.

Further, the embodiment is designed such that the first image processing section 13 includes the image processing in which the data amount reduction by the error diffusion processing influences the processing results, but when the first image processing section 13 does not include such image processing or when the influence of the error diffusion processing is small, it may be configured to form the master image 52 to which the error diffusion processing is always applied.

Further, the error diffusion circuit 13e is placed in the most downstream in the first image processing section 13, but it may be configured such that the first image processing section 13 includes a processing circuit further downstream than the error diffusion circuit 13e.

The embodiment reduces the number of density levels by the error diffusion processing, but the number of density levels may be reduced by another method. The method of reducing the data amount is not limited to reducing the number of density levels. For example, the resolution may be reduced therein.

The image processing in the first and second processing sections 13, 15 are not limited to those illustrated in the embodiment. Particularly, when the image processing of reducing the data amount is provided in the first image processing section 13 and the image processing in which the data amount increases is provided in the second image processing 15, the data amount is the most reduced when the image data is stored in the image storing section 14, thereby the storing capacity can be effectively used.

Figure 9:
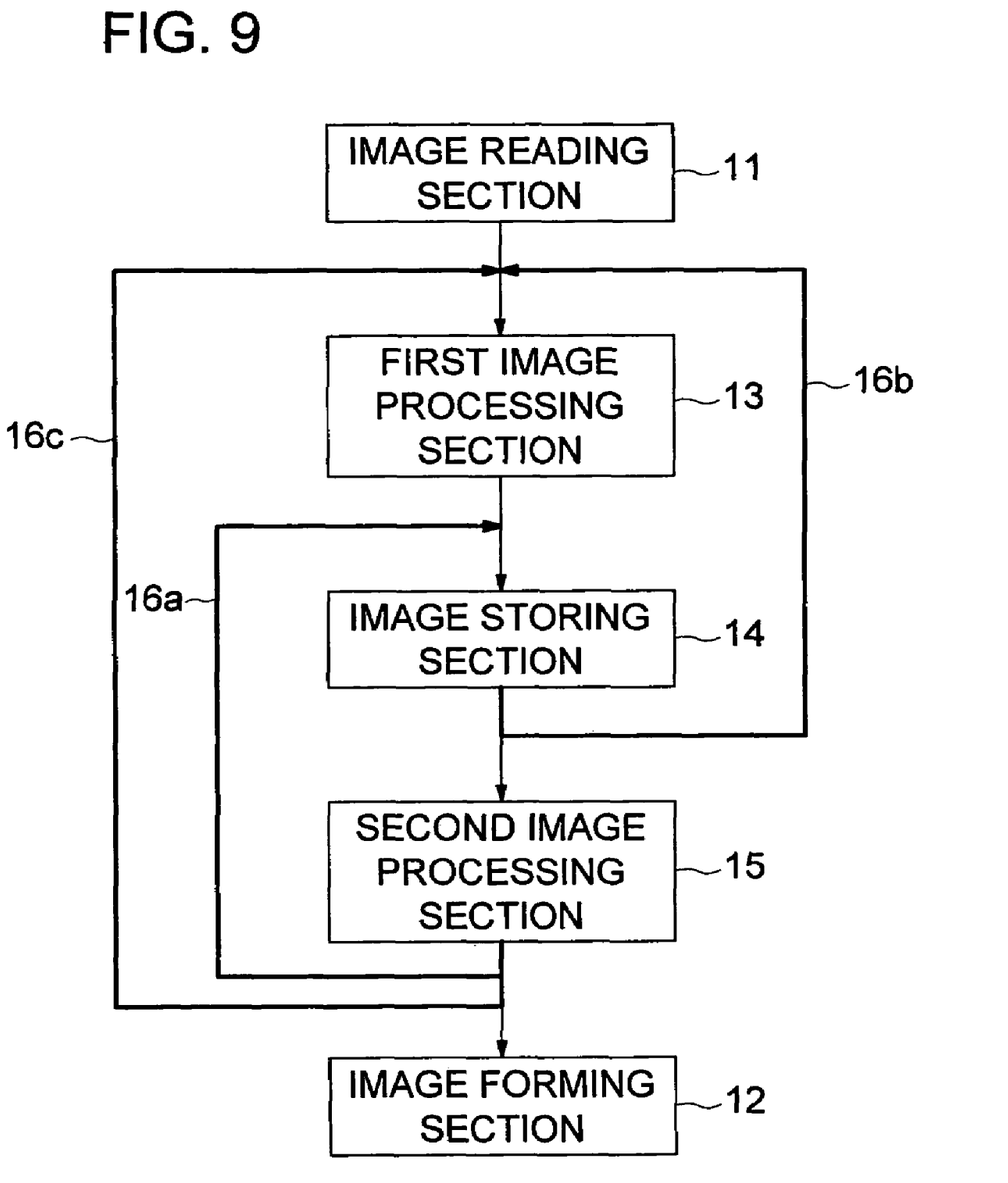
FIG. 9 is a block diagram showing the apparatus structure taking different forms of loop-back path.

In addition, the embodiment is configured such that the output of the second image processing section 15 is returned to the first image processing section 15 by the loop-back path (loop-back path 16c), but as shown in FIG. 9, it may include the loop-back path 16a for retuning the output of the second image processing section 15 to the image storing section 14, or the loop-back path 16b for retuning the image data read out of the image storing section 14 to the first image processing section 13. Also the configured is allowable in which all of the loop-back paths 16a to 16c are included.

In the loop-back path 16a, the image processing in which the setup values are changed for each sample image is carried out exclusively in the second image processing section 15. In other words, the master image 52 to which the image processing has been applied in the first image processing section 13 is stored in the image storing section 14, and when the sample images 53 are formed from the master image 52, different processing are applied to the individual images in the second image processing section 15, thereby plural types of sample images with different processing contents applied thereto are formed.

In the loop-back path 16b, the image processing in which the setup values are changed for each sample image is carried out exclusively in the first image processing section 13. In other words, the master image 52 to which the image processing common to the whole sample images is applied in the first image processing section 13 is stored in the image storing section 14, and when the sample images 53 are formed from the master image 52, different processing are further applied to the individual images in the first image processing section 13, thereby plural types of samples images are formed. In the second image processing section 15, the common processing for output is applied.

Further, the embodiment is designed to receive the instruction to form the sample copy from the sample copy setting screen 30, but the instruction input method is not limited thereto, and may be configured to receive the instruction from the external device such as a personal computer. In this case, a printer I/F functions as the instruction inputting section.

Incidentally, the configuration is also allowable in which the image processing in the image processing apparatus 10 are realized by software. Even in this case, the upstream and downstream relations among the first image processing section 13, the image storing section 14, the second image processing section 15, and the loop-back path 16 is maintained.

With the image processing apparatus, image processing method and image processing program according to the present embodiments, plural types of image data with different image processing contents to be applied thereto can be formed from the same image data as an original. Further, the image storing section can be commonly used for storing the image data which is a source for forming plural types of image data and for storing the image data as the processing results, thereby the memory configuration is simplified.

Further, the first and second image processing sections are separately placed upstream and downstream respectively, so that the processing appropriate before the storage to the image storing section can be allocated to the first image processing section, while the processing appropriate after the storage can be allocated to the second image processing section, allowing the optimization of the configuration.

Further, the configuration that allows to designate the area of sample copy to be processed, the differences in the image processing effects can be compared in the appropriate target area according to each document.

The configuration that allows to selectively execute one or more image processing of the various types of image processing executable in the first and second image processing sections, and that allows to have the image data pass through without applying any image processing, have less functional restrictions, thereby various processing results can be obtained in the same circuit configuration.

The configuration that stores the image data with the data amount reduced smaller than that of the master image data, the image capacity required for the image storing section can be suppressed.

In the above embodiments, the image data as an original is capable of being stored, through the first image processing section, in the image storing section downstream thereof. Then, the image data stored in the image storing section can be passed through the second image processing section downstream thereof, returned to the upstream first image processing section via the loop-back path and stored again in the image storing section through the first image processing section. For example, plural types of image data with different processing contents applied thereto can be formed from the image data stored in the image storing section, by having the image data pass through a circular path, for example, from the image storing section to the second image processing circuit, the loop-back path, the first image processing circuit and to the image storing section, with changing the image processing contents to be applied in the first and second image processing sections. As the first and second image processing sections are separately placed upstream and downstream of the image storing section, processing appropriate before the storage to the image storing section can be allocated to the first image processing section, while processing appropriate after the storage can be allocated to the second image processing section.

Also, in the above embodiments, the image data as an original is capable of being stored, through the first image processing section, in the image storing section downstream thereof. Then, the image data stored in the image storing section can be passed through the second image processing section downstream thereof and stored again in the image storing section through the loop-back path. For example, plural types of image data with different processing contents applied thereto can be formed, from the image data stored in the image storing section, by having the image data pass through a circular path, for example, from the image storing section to the second image processing circuit, the loop-back path, and to the image storing section, with changing the image processing contents to be applied in the second image processing section. As the first and second image processing sections are separately placed upstream and downstream of the image storing section, processing appropriate before the storage to the image storing section can be allocated to the first image processing section, while processing appropriate after the storage can be allocated to the second image processing section.

In the above embodiments, the image data as an original is capable of being stored, through the first image processing section, in the image storing section downstream thereof. Then, the image data stored in the image storing section can be returned to the first image processing section through the loop-back path and stored again in the image storing section through the first image processing section. For example, plural types of image data with different processing contents applied thereto can be formed from the image data stored in the image storing section, by having the image data pass through a circular path, for example, from the image storing section to the loop-back path, the first image processing circuit and to the image storing section, with changing the image processing contents to be applied in the first image processing section. The individual image data stored in the image storing section can be further subjected to the image processing before being output. As the first and second image processing sections are separately placed upstream and downstream of the image storing section, processing appropriate before the storage to the image storing section can be allocated to the first image processing section, while processing appropriate after the storage can be allocated to the second image processing section.

In the above embodiments, the designation of the target area, which is not specifically limited, may be made by a method of selecting among a predetermined plurality of options, or by a method that a user arbitrarily sets up the position, size, shape and the like of the target area. It is also allowable that two or more areas are designated at a time. The user can obtain the image to which the image processings are applied relating to the desired target area. Further, the formation of plural types of image data exclusively for the designated target area leads to reduction of the storing capacity for storing the processing results.

The above embodiments can select and execute one or more image processing of the plural types of executable image processing. Because of this feature, various processing results can be obtained with the same circuit configuration. It is possible to execute only one type of image processing, but also two or more types of image processing in combination, at a time.

The above embodiments allow the first image processing section and/or the second image processing section to have the image data pass through without applying any image processing. Because of this feature, either of the first or second image processing section can be caused to function without changing the path the image data passes through, so that the flexibility in the processing contents to be applied during the image data is circulated around the circular path is further expanded. It is also possible to have the input image data as an original pass through the first image processing section without processing to store in the image storing section.

Also, if the first processing section includes the image processing for reducing the data amount, the embodiments can reduce the data amount of the image data as an original before storing the data in the image storing section. Used herein as the method of reducing the data amount may be a method of reducing the number of density levels per pixel, trimming or lowering the resolution.

In the embodiments, if the data amount is reduced in the first image processing section upstream of the image storing section and the data amount increases in the second image processing section downstream of the image storing section, the image data with the most reduced data amount is stored in the image storing section.

In the embodiments, if the image data with the data amount reduced smaller than the data image as an original is stored in the image storing section, the storing capacity required for the image storing section is reduced. The data amount reduction processing may be carried out in the first image processing section or in the second image processing section. In the latter case, the image data after the data amount reduction is stored in the image storing section through the loop-back path.

If the image data before the data amount reduction are stored in the image storing section and plural types of image data are generated based on the stored image data, it can appropriately apply individual image processing without being influenced by the data amount reduction. In the case of requiring any processing to be further applied to the formed individual image data or other cases, the image data is finally subjected to the data amount reduction processing and then stored in the image storing section, so that the storing capacity required for the image storing section is reduced.

Also, if the data amount reduction is carried out by lowering the number of density levels per pixel, the number of density levels is lowered and the bit number per pixel decreases, thereby the data amount is reduced. For example, when the grayscale image data in which one pixel is represented by an 8-bit depth is converted into the image data virtually represented by a one-bit depth binary data by an error diffusion processing and other related processing, the data amount is reduced to one-eighth.

Also, if the second image processing carries out an image processing that the data amount reduction is unlikely to influence the processing results, it can store the image data after the data amount reduction in the image storing section, and can obtain the processing results from the second image processing section while suppressing the influence of the data amount reduction, when further applying the image processing to the image data in the second image processing section.

If the processing section likely to be influenced by the data amount reduction is placed upstream of the processing section for reducing the data amount, the data amount reduction processing can be executed after the image processing likely to be influenced by the data amount reduction is finished, allowing both of the ensuring of the image processing effectiveness and the storing capacity reduction in the image storing section.

Also if the generated pleural types of image data are laid out in the image area corresponding to the output paper, the date in the image area is printed and the so-called sample copy is capable of being output.

What is claimed is:

1. An image processing apparatus comprising:
   (a) a first image processing section to which original image data is inputted;
   (b) an image storing section connected downstream of the first image processing section;
   (c) a second image processing section connected downstream of the image storing section;
   (d) a loop-back path through which image data output from the second image processing section is returned to the first image processing section;
   (e) an instruction inputting section which inputs an instruction in relation to a processing content; and
   (f) a controller which controls a flow of image data and contents to be processed in the first and second image processing sections according to the instruction input from the instruction inputting section,
   wherein a plurality of types of image data different from each other in contents which have been processed are capable of being generated based on the original image data.

2. The image processing apparatus of claim 1, wherein the instruction inputting section inputs a designation of an area to be processed, and the controller generates the plurality of types of image data in relation to the designated area to be processed.

3. The image processing apparatus of claim 1, wherein at least one type of image processing of a plurality of types of executable image processing in the first and second image processing sections, can be selectively carried out.

4. The image processing apparatus of claim 1, wherein at least one of the first and second image processing sections are capable of making the image data pass without being image processed.

5. The image processing apparatus of claim 1, wherein the first image processing section conducts image processing in which a data amount is reduced.

6. The image processing apparatus of claim 5, wherein the second image processing section conducts image processing in which a data amount is increased.

7. The image processing apparatus of claim 5, wherein a reduction of the data amount is carried out by reducing the number of density levels per pixel.

8. The image processing apparatus of claim 5, wherein image processing in the second image processing section is carried out such that a reduction of data amount is unlikely to influence a result of the image processing.

9. The image processing apparatus of claim 8, wherein the first image processing section includes a processing section provided upstream of a processing section in which the data amount is reduced, which carries out image processing in which the reduction of the data amount more affects the result of the image processing than in the second image processing section.

10. The image processing apparatus of claim 1, wherein image data in which a data amount has been reduced less than that of the original image data, is stored in the image storing section.

11. The image processing apparatus of claim 10, wherein the plurality of types of image data different from each other in contents which have been processed are generated based on the image data stored in the image storing section, which has been reduced.

12. The image processing apparatus of claim 1, wherein the plurality of types of image data different from each other in contents which have been processed are generated based on image data which has been stored in the image storing section before a data amount of which has been reduced, and wherein the data amount of the generated image data are reduced, and then the image data, the amount of which has been reduced, are stored.

13. The image processing apparatus of claim 1, wherein the image data is stored in the image storing section so that the plurality of types of image data which have been generated are laid out in an image area of the image storing section corresponding to an output sheet.

14. The image processing apparatus of claim 1, further comprising an image forming section which prints a processing result.

15. The image processing apparatus of claim 1, wherein the original image data is inputted from a reading device which reads a document image or an input section for printing data.

16. The image processing apparatus of claim 1, wherein the processing contents of the plurality of types of image data are differentiated by varying processing parameters.

17. An image processing apparatus comprising:
(a) a first image processing section to which original image data is inputted;
(b) an image storing section connected downstream of the first image processing section;
(c) a second image processing section connected downstream of the image storing section;
(d) a loop-back path through which image data output from the second image processing section is returned to the image storing section;
(e) an instruction inputting section which inputs an instruction in relation to a processing content; and
(f) a controller for controlling a flow of image data and contents to be processed in the first and second image processing sections according to the instruction input from the instruction inputting section,
wherein a plurality of types of image data different from each other in contents which have been processed are capable of being generated based on the original image data.

18. An image processing apparatus comprising:
(a) a first image processing section to which original image data is inputted;
(b) an image storing section connected downstream of the first image processing section;
(c) a second image processing section connected downstream of the image storing section;
(d) a loop-back path through which image data read out from the image storing section is returned to the first image processing section;
(e) an instruction inputting section which inputs an instruction in relation to a processing content; and
(f) a controller for controlling a flow of image data and contents to be processed in the first and second image processing sections according to the instruction input from the instruction inputting section,
wherein a plurality of types of image data different from each other in contents which have been processed are capable of being generated based on the original image data.

19. An image processing method comprising:
(a) a first step of inputting original image data and processing in a first image processing section;
(b) a second step of storing the image data output from the first image processing section into an image storing section;
(c) a third step of reading out the image data stored in the image storing section and processing in the second image processing section;
(d) a fourth step of returning the image data output from the second image processing section to the first image processing section and reprocessing;
(e) a fifth step of storing the reprocessed image data into the image storing step; and
(f) repeating the third step through the fifth step while changing a content to be processed in the first and second image processing sections, thereby generating a plurality of types of image data different from each other in contents which have been processed.

20. The image processing method of claim 19, further comprising a step of receiving a designation of an area to be processed, and forming the plurality of types of image data in relation to the designated area to be processed.

21. The image processing method of claim 19, wherein at least one type of image processing of a plurality of types of image processing executable in the first and second image processing sections is selectively executed.

22. The image processing method of claim 19, wherein the image data is passed through the first and second image processing sections without being image processed.

23. The image processing method of claim 19, wherein image data in which a data amount has been reduced less than that of the original image data is stored in the image storing section.

24. The image processing method of claim 19, further comprising a step of laying out the plurality of types of image data which have been formed, in an image area of the image storing section corresponding to an output sheet, and outputting.

* * * * *